United States Patent
Qu

(10) Patent No.: US 9,448,412 B2
(45) Date of Patent: Sep. 20, 2016

(54) COLOR FILTER SUBSTRATE, FABRICATION METHOD THEREOF AND DISPLAY DEVICE

(71) Applicant: BEIJING BOE OPTOELECTRONICS TECHNOLOGY CO., LTD., Beijing (CN)

(72) Inventor: Lianjie Qu, Beijing (CN)

(73) Assignee: BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 232 days.

(21) Appl. No.: 14/013,815

(22) Filed: Aug. 29, 2013

(65) Prior Publication Data
US 2014/0063601 A1 Mar. 6, 2014

(30) Foreign Application Priority Data
Aug. 31, 2012 (CN) .......................... 2012 1 0320912

(51) Int. Cl.
| | |
|---|---|
| G02B 27/22 | (2006.01) |
| G02B 5/04 | (2006.01) |
| G02B 7/18 | (2006.01) |
| G02B 5/22 | (2006.01) |
| G02B 5/20 | (2006.01) |
| G02F 1/1335 | (2006.01) |

(52) U.S. Cl.
CPC ........... *G02B 27/2214* (2013.01); *G02B 5/201* (2013.01); *G02F 1/133526* (2013.01); *G02F 2001/133565* (2013.01)

(58) Field of Classification Search
CPC .. G02B 27/2214; G02B 5/201; G02B 5/045; G02B 3/005; G02B 5/22; G02B 27/22; G02B 5/04; G02B 27/2228; G02B 6/0053; G02B 27/0966; G02B 3/0006; G02B 5/124; G02B 5/20; G02B 6/0036; G02F 1/133514; H04N 13/0404; H04N 13/0422; H04N 13/0406
USPC ....... 359/462, 463, 464, 467, 475, 477, 831, 359/837, 885, 891, 892, 580, 589, 590
See application file for complete search history.

(56) References Cited

U.S. PATENT DOCUMENTS

| | | | |
|---|---|---|---|
| 2005/0280637 A1* | 12/2005 | Ikeda et al. .................... 345/173 |
| 2007/0058258 A1* | 3/2007 | Mather .............. G02B 27/2214 359/619 |
| 2011/0170184 A1* | 7/2011 | Wolk ........................... 359/463 |

* cited by examiner

Primary Examiner — Jade R Chwasz
(74) Attorney, Agent, or Firm — Ladas & Parry LLP

(57) ABSTRACT

A color filter substrate, a fabrication method thereof, and a display device are provided. The color filter substrate includes: a substrate and a color filter film formed on a light incidence side of the substrate. At least one light refraction structure is continuously formed on a light incidence side of the color filter substrate, and each light refraction structure corresponds to a set of field of views (FOVs). The set of FOVs includes a left-eye FOV and a right-eye FOV, light rays from the left-eye FOV pass through a portion of the light refraction structure to which the left-eye FOV corresponds into a left-eye view zone, and light rays from the right-eye FOV pass through the other portion of the light refraction structure to which the right-eye FOV corresponds into a right-eye view zone.

13 Claims, 3 Drawing Sheets

COLOR FILTER SUBSTRATE, FABRICATION METHOD THEREOF AND DISPLAY DEVICE

TECHNICAL FIELD

Embodiments of the invention relate to a color filter substrate, a fabrication method thereof, and a display device.

BACKGROUND

Stereoscopic image display technology is also known as three-dimensional image display technology or 3D (Three Dimensions) display technology, which is committed to completely reproduce the three-dimensional information of objective images and display stereoscopic images with feelings of depth. A viewer that watches a 3D image can directly recognize the distance and depth relations among objects in the 3D image, which enables the viewer to feel as if he is on the scene and enjoy intense visual impact.

The 3D display technology can be divided into visually-aided 3D display technology and naked-eye 3D display technology. The visually-aided 3D display technology achieves the 3D display effect with the aid of 3D glasses, 3D helmets or other visually-aided devices. Since the visually-aided 3D display technology is easy to realize, currently most 3D display employs the visually-aided 3D display technology. However, the visually-aided 3D display technology requires the viewer to wear visually-aided glasses or helmets, and thus causes a huge inconvenience to the viewer. The naked-eye 3D display technology enables the viewer to watch the 3D image without wearing any visually-aided devices such as visually-aided glasses or helmets, and thus is getting more and more attentions.

Stereoscopic vision is a born ability of human eyes. A person can perceive a depth of an object by information such as subtle difference and parallax etc. of the image observed by the left and right eyes, so as to identify the three-dimensional information of the object. Referring to the case that the person observes the external world with his eyes, the problem to be solved by the naked-eye 3D display technology is to separate the left-eye image and right-eye image so that the left-eye image and right-eye image are respectively observed by the left eye and right eye and the left and right eyes obtain parallax images without mutual interference. The key point here is how to assign the left eye and right eye images to the left and right eyes, respectively.

Currently, the naked-eye 3D display technology generally employs a 3D grating, and the 3D grating has a beam-splitting function so that the left-eye and right-eye images are respectively emitted to the left and right eyes to realize the 3D display effect.

The 3D grating mainly includes a slit grating and a lenticular lens grating. The slit grating has caught great attention because of its simple structure and low cost. The structure of the 3D liquid crystal display having the slit grating is shown in FIG. 1. As shown in FIG. 1, the 3D liquid crystal display mainly includes an array substrate 11, a color filter substrate 12, and a liquid crystal layer 13 sandwiched between the array substrate 11 and the color filter substrate 12. Polarizing sheets are provided on the outer surfaces of the array substrate 11 and the color filter substrate 12, and the slit grating 14 is provided on a side of the color filter substrate 12 facing to the liquid crystal layer 13. However, the 3D display with the slit grating has the following drawbacks. The slit grating generally consists of a transparent strip region and an opaque strip region, and the opaque strip region will block a portion of the light emitted from a backlight unit, resulting in low brightness of the 3D display. The lenticular lens grating is formed of transparent materials and will not block the light. However, the lenticular lens grating is of high production cost and needs to be additionally formed on the color filter substrate, resulting in a more complexity and an even higher production cost of the 3D display.

SUMMARY

According to an aspect of the invention, a color filter substrate is provided. The color filter substrate comprises: a substrate and a color filter film formed on a light incidence side of the substrate. At least one light refraction structure is continuously formed on a light incidence side of the color filter substrate, and each light refraction structure corresponds to a set of field of views (FOVs). The set of FOVs includes a left-eye FOV and a right-eye FOV, light rays from the left-eye FOV pass through a portion of the light refraction structure to which the left-eye FOV corresponds into a left-eye view zone, and light rays from the right-eye FOV pass through the other portion of the light refraction structure to which the right-eye FOV corresponds into a right-eye view zone.

According to another aspect of the invention, a display device is provided. The display device comprises the color filter substrate as described above.

According to yet another aspect of the invention, a fabrication method of a color filter substrate is provided. The method comprises:

forming a color filter film on a substrate; and continuously forming at least one light refraction structure by the color filter film through a patterning process. Each light refraction structure corresponds to a set of FOVs, the set of FOVs includes a left-eye FOV and a right-eye FOV, light rays from the left-eye FOV pass through the portion of the light refraction structure to which the left-eye FOV corresponds into the left-eye view zone, and light rays from the right-eye FOV pass through the other portion of the light refraction structure to which the right-eye FOV corresponds into the right-eye view zone.

According to still another aspect of the invention, a fabrication method of a color filter substrate is provided. The method comprises:

continuously forming at least one light refraction structure by a light incidence surface of a substrate by a patterning process; and forming a color filter film on the light refraction structure on the substrate. Each light refraction structure corresponds to a set of FOVs, the set of FOVs includes a left-eye FOV and a right-eye FOV, light rays from the left-eye FOV pass through the portion of the light refraction structure to which the left-eye FOV corresponds into the left-eye view zone, and light rays from the right-eye FOV pass through the other portion of the light refraction structure to which the right-eye FOV corresponds into the right-eye view zone.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
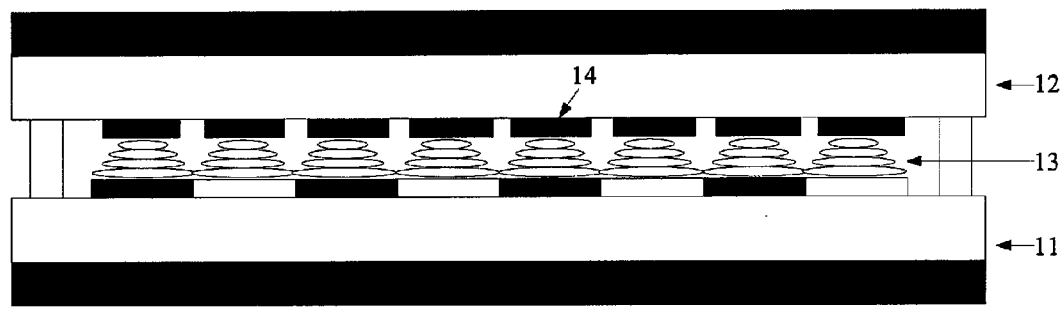
FIG. 1 is a structural schematic diagram illustrating a conventional 3D liquid crystal display device.
Figure 2A:
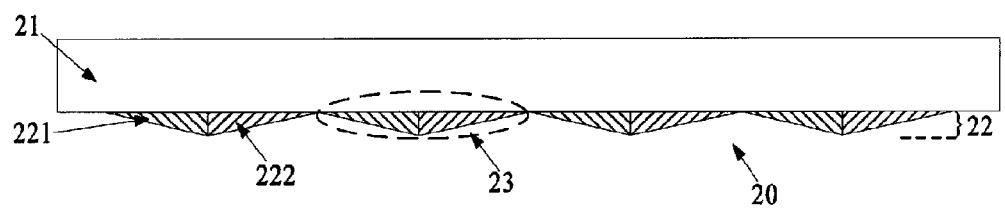
FIG. 2a is a structural schematic diagram illustrating a color filter substrate according to an embodiment of the invention.

A color filter substrate 20 according an embodiment of the invention is shown in FIG. 2a. The color filter substrate 20 comprises: a substrate 21 and a color filter film 22 formed on a light incidence side of the substrate 21.

At least one light refraction structure 23 is continuously formed on a light incidence side of the color filter substrate 20, and each light refraction structure 23 corresponds to a set of field of views (FOVs).

The light refraction structure 23 may be a triangular light refraction structure or a lenticular lens light refraction structure. The triangular light refraction structure may include a surface in parallel with the substrate 21 and two inclined surface. Light rays from a left-eye FOV pass through the inclined surface to which the left-eye FOV corresponds into a left-eye view zone, and light rays from a right-eye FOV pass through the other inclined surface to which the right-eye FOV corresponds into a right-eye view zone. The lenticular lens light refraction structure may have a surface being a cylindrical curved surface and the other surface in parallel with the substrate. Light rays from the left-eye FOV pass through a portion of the cylindrical curved surface to which the left-eye FOV corresponds into the left-eye view zone, and light rays from the right-eye FOV pass through the other portion of the cylindrical curved surface to which the right-eye FOV corresponds into the right-eye view zone.

It should be noted that in the color filter substrate 20 shown in FIG. 2a, the triangular light refraction structure is illustrated as an example.

In the color filter substrate 20 shown in FIG. 2a, the at least one light refraction structure 23 is directly formed by the color filter film 22 on the substrate 21.

The set of FOVs includes the left-eye FOV and the right-eye FOV. Light rays from the left-eye FOV pass through a portion of the light refraction structure to which the left-eye FOV corresponds into the left-eye view zone, and light rays from the right-eye FOV pass through the other portion of the light refraction structure to which the right-eye FOV corresponds into the right-eye view zone.

It should be noted that the substrate 21 may be made of glass, resin or other transparent materials. In the color filter film 22, a color filter film portion 221 corresponds to the left-eye FOV, and a color filter film portion 222 corresponds to the right-eye FOV.

In the color filter substrate according to the embodiment of the invention, at least one light refraction structure is continuously formed on the color filter substrate, each light refraction structure corresponds to the set of FOVs, and the set of FOVs includes the left-eye FOV and the right-eye FOV. Light rays from the left-eye FOV pass through the portion of the light refraction structure to which the left-eye FOV corresponds into the left-eye view zone, light rays from the right-eye FOV pass through the other portion of the light refraction structure to which the right-eye FOV corresponds into the right-eye view zone, so that the beam-splitting effect as the slit grating can be achieved. In this way, a left-eye image and a right-eye image from a display device can respectively enter into the left and right eyes of the viewer through the light refraction structure, and thereby the 3D display effect can be achieved.

In the color filter substrate according to the embodiment of the invention, it is not necessary to provide the slit grating, thus light-blocking due to the opaque region of the slit grating can be avoided. In addition, in the color filter substrate according to the embodiment of the invention, the light refraction structure is directly formed of the color filter film on the color filter substrate, thus there is no need to form an additional layer for the light refraction structure on the color filter substrate. Therefore, the brightness of the display device comprising the color filter substrate can be improved, the production complexity and cost of the display device can be reduced, and in the meantime, the overall thickness and weight of the display device can be reduced for the light refraction structure is not necessary to be formed by using an additional layer.

As illustrated in FIG. 2a, the thickness of the color filter film 22 in each light refraction structure 23 is not uniform, so that the triangular light refraction structure 23 is formed. The two inclined surfaces of the triangular light refraction structure 23 may have an equal length, and the triangular light refraction structure may be of an isosceles triangle. During the production process of the light refraction structure, the color filter film 22 is firstly deposited on the surface of the substrate 21, and then a mask plate with gradually varied grayscales is adopted to perform patterning process on the color filter film 22, so that the color filter film 22 of non-uniform thickness is formed, that is, the light refraction structure 23 shown in FIG. 2a is formed on the color filter substrate.

Figure 2B:
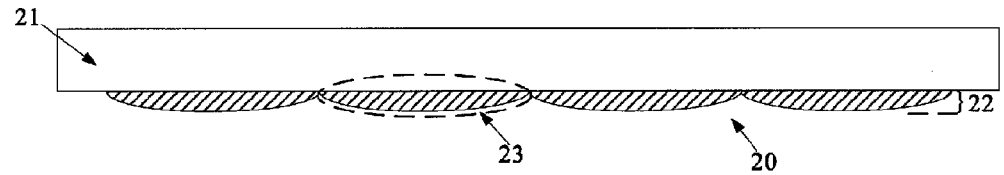
FIG. 2b is a structural schematic diagram illustrating another color filter substrate according to an embodiment of the invention.

Alternatively, as shown in FIG. 2b, the light refraction structure 23 may also be the lenticular lens light refraction structure. The color filter film 22 of non-uniform thickness directly forms the lenticular lens light refraction structure 23, and the cylindrical curved surface of the lenticular lens light refraction structure 23 is a eudipleural cylindrical curved surface.

The formation of the light refraction structure shown in FIG. 2a and FIG. 2b does not require any treatments on the substrate, but merely requires performing processing on the color filter film. Therefore, the production difficulty of the color filter substrate with the light refraction structure can be effectively reduced and the production cost can be decreased.

Compared with the color filter film in the conventional technology, the material for forming the color filter film in the embodiment of the invention is not changed but only the shape of the color filter film in the embodiment of the invention is changed. In addition, the color filter film on the color filter substrate according to the embodiment of the invention may include various color filter patterns (such as R, G and B color filter patterns) that are alternately arranged. In each light refraction structure, the color filter film corresponding to each FOV also includes the various color filter patterns.

Figure 2C:
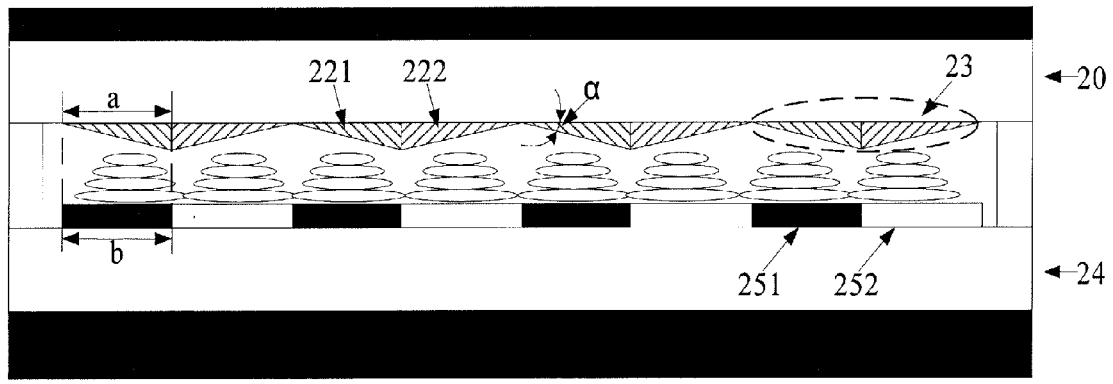
FIG. 2c is a structural schematic diagram illustrating a liquid crystal display panel according to an embodiment of the invention.

A liquid crystal display panel according to an embodiment of the invention is shown in FIG. 2c. Take the color filter substrate with the triangular light refraction structure shown in FIG. 2a as an example, a description is made for the liquid crystal display panel. The liquid crystal display panel comprises: a color filter substrate 20, an array substrate 24, and liquid crystal filled between the color filter substrate 20 and the array substrate 24. Polarizing sheets are further provided on the outer surfaces of the color filter substrate 20 and the array substrate 24. The color filter substrate 20 is the color filter substrate shown in FIG. 2a.

As shown in FIG. 2c, the inclined surface of the light refraction structure 23 has a width a equal to a width b of the FOV. That is, a width of the color filter film portion 221 for the left-eye FOV is equal to a width of a sub-pixel 251 for the left-eye FOV, and a width of the color filter film portion 222 for the right-eye FOV is equal to a width of a sub-pixel 252 for the right-eye FOV. The width of the sub-pixel 251 for the left-eye FOV and the width of the sub-pixel 252 for the right-eye FOV are both equal to b.

Further, the angle α formed between each of the inclined surfaces of the light refraction structure 23 and the substrate 21 is within 15°~60°. The angle α within such range can be obtained by a simple process. In addition, the light refraction structure 23 with the angle α a within such range has a better beam-splitting effect, so that the display quality can be improved.

Figure 3:
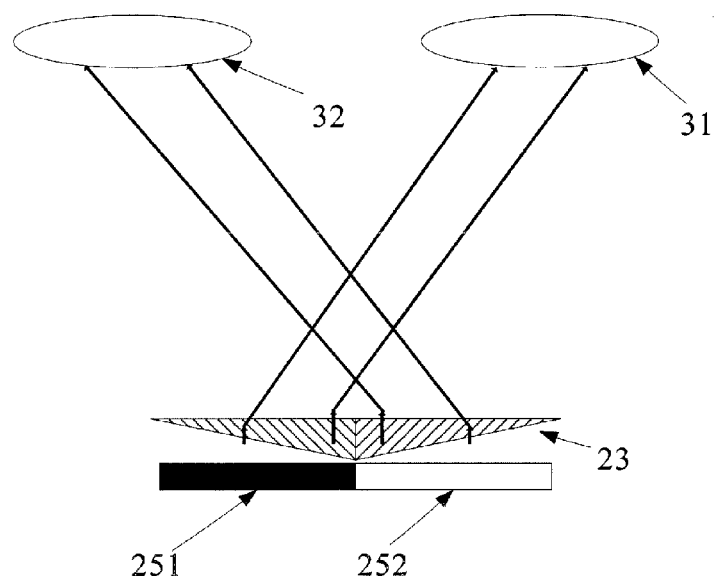
FIG. 3 is a schematic diagram illustrating display principle of a 3D liquid crystal display device according to an embodiment of the invention.

The principle of achieving light splitting effect by using the color filter substrate in FIG. 2a is shown in FIG. 3. The adjacent left-eye FOV sub-pixel 251 and right-eye FOV sub-pixel 252 respectively emit a left-eye FOV light and a right-eye FOV light, the emitted lights pass through the light refraction structure 23 and are split. In this way, light emitted from the left-eye FOV sub-pixel 251 passes through the inclined surface of the light refraction structure 23 to which the left-eye FOV corresponds and reaches the left eye 31 of the viewer, and the left eye of the viewer catches the left-eye FOV light; light emitted from the right-eye FOV sub-pixel 252 passes through the other inclined surface of the light refraction structure 23 to which the right-eye FOV corresponds and reaches the right eye 32 of the viewer, and the right eye of the viewer catches the right-eye FOV light. Therefore, merely by irradiating the emitted lights from sub-pixels of different FOVs onto different inclined surfaces of the light refraction structure and splitting the emitted lights by the light refraction structure respectively to the left and right eyes of the viewer, the 3D display effect can be achieved.

In the color filter substrate according to the embodiment of the invention, it is not necessary to provide the slit grating, thus light-blocking due to the opaque region of the slit grating can be avoided. In addition, in the color filter substrate according to the embodiment of the invention, the light refraction structure is directly formed of the color filter film on the color filter substrate, thus there is no need to form an additional layer for the light refraction structure on the color filter substrate. Therefore, the brightness of the display device comprising the color filter substrate can be improved, the production complexity and cost of the display device can be reduced, and in the meantime, the overall thickness and weight of the display device can be reduced for the light refraction structure is not necessary to be formed by using an additional layer.

Figure 4A:
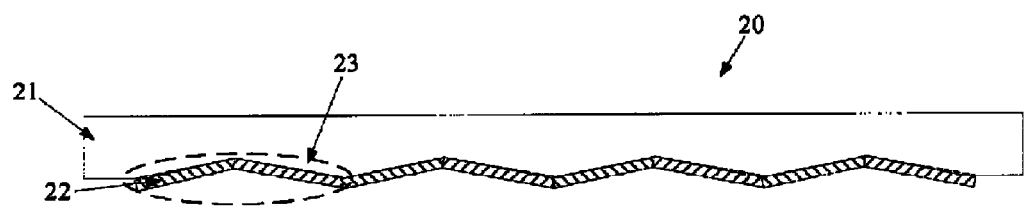
FIG. 4a is a structural schematic diagram illustrating yet another color filter substrate according to an embodiment of the invention.

Alternatively, the color filter substrate 20 according to the embodiment of the invention may have the structure shown in FIG. 4a. In the color filter substrate 20 shown in FIG. 4a, the light refraction structure 23 is formed by a light incidence surface of the substrate 21, and the color filter film 22 is formed on the light refraction structure 23.

Similar to the color filter substrate 20 shown in FIG. 2a and FIG. 2b, the substrate 21 may be made of glass, resin or other transparent materials, and the light refraction structure 23 may be the triangular light refraction structure or the lenticular lens light refraction structure. In the color filter substrate 20 shown in FIG. 4a, the triangular light refraction structure is illustrated as an example.

Figure 4B:
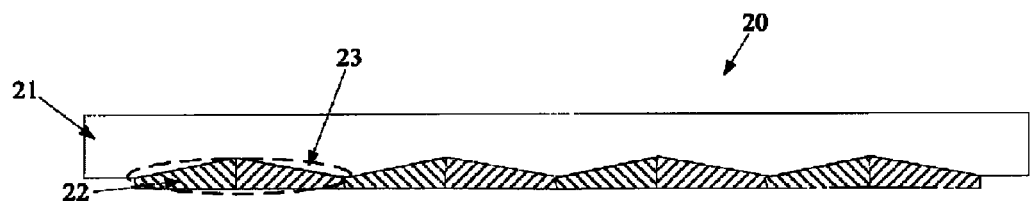
FIG. 4b is a structural schematic diagram illustrating still another color filter substrate according to an embodiment of the invention.

In the case that the light refraction structure 23 is formed by the light incidence surface of the substrate 21, the color filter film 22 may have a uniform thickness as shown in FIG. 4a, or the color filter film 22 may have a non-uniform thickness so that a light incidence surface of the color filter film 22 is a flat surface as shown in FIG. 4b.

During the production process of the color filter substrate shown in FIG. 4a or FIG. 4b, a photoresist is firstly applied on the light incidence surface of the substrate 21, and then a mask plate with gradually varied grayscales is adopted to perform patterning process on the light incidence surface of the substrate 21, so that the light refraction structure 23 is obtained. Then the color filter film 22 is applied or deposited on the light refraction structure 23 on the substrate 21, so that the color filter substrate 20 shown in FIG. 4a or FIG. 4b is formed.

During the formation of the light refraction structure 23 shown in FIG. 4a or FIG. 4b, it is not necessary to perform any treatments on the color filter film so that the color quality of the display device comprising the color filter substrate can be ensured.

Figure 4C:
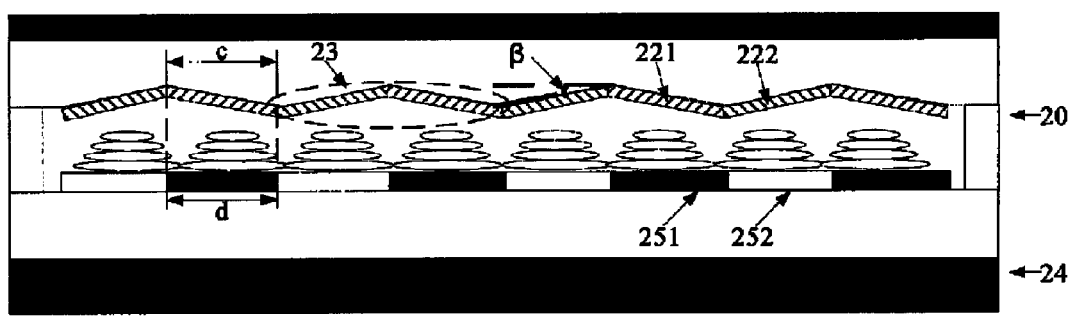
FIG. 4c is a structural schematic diagram illustrating another liquid crystal display panel according to an embodiment of the invention.

A liquid crystal display panel according to an embodiment of the invention is shown in FIG. 4c. Take the color filter substrate 20 with the light refraction structure shown in FIG. 4a as an example, a description is made for the liquid crystal display panel. As shown in FIG. 4c, the liquid crystal display panel comprises: a color filter substrate 20, an array substrate 24, and liquid crystal filled between the color filter substrate 20 and the array substrate 24. Polarizing sheets are further provided on the outer surfaces of the color filter substrate 20 and the array substrate 24. The color filter substrate 20 is the color filter substrate shown in FIG. 4a. In the liquid crystal display panel as shown in FIG. 4c, the inclined surface of the light refraction structure 23 has a width c equal to a width d of the FOV. That is, a width of the color filter film portion 221 for the left-eye FOV is equal to a width of a sub-pixel 251 for the left-eye FOV, and a width of the color filter film portion 222 for the right-eye FOV is equal to a width of a sub-pixel 252 for the right-eye FOV. The width of the sub-pixel 251 for the left-eye FOV and the width of the sub-pixel 252 for the right-eye FOV are both equal to d.

Further, the angle β formed between each of the inclined surfaces of the light refraction structure 23 and the substrate 21 is within 15°~60°. The angle β within such range can be obtained by a simple process. In addition, the light refraction structure 23 with the angle β within such range has a better beam-splitting effect, so that the display quality can be improved.

The color filter substrates shown in FIG. 4a or FIG. 4b can also achieve bean-splitting effect, and the principle thereof is similar to that shown in FIG. 3, which shall not be described here for simplicity.

In the color filter substrate according to the embodiment of the invention, it is not necessary to provide the slit grating, thus light-blocking due to the opaque region of the slit grating can be avoided. In addition, in the color filter substrate according to the embodiment of the invention, the light refraction structure is formed by the light incidence surface of the substrate for forming the color filter substrate, thus there is no need to form an additional layer for the light refraction structure on the color filter substrate. Therefore, the brightness of the display device comprising the color filter substrate can be improved, the production complexity and cost of the display device can be reduced, and in the meantime, the overall thickness and weight of the display device can be reduced for the light refraction structure is not necessary to be formed by using an additional layer.

According to an embodiment of the invention, a display device is further provided. The display device includes any one of the above-mentioned color filter substrates.

It should be noted that the display device according to the embodiment of the invention may be any one of the display devices which realize color display by the color filter film, such as LCD (Liquid Crystal Display) or white light OLED (Organic Light-Emitting Diode) display.

The display device according to the embodiment of the invention comprises the color filter substrate on which at least one light refraction structure is continuously formed, each light refraction structure corresponds to the set of FOVs, and the set of FOVs includes the left-eye FOV and the right-eye FOV. Light rays from the left-eye FOV pass through the portion of the light refraction structure to which the left-eye FOV corresponds into the left-eye view zone, light rays from the right-eye FOV pass through the other portion of the light refraction structure to which the right-eye FOV corresponds into the right-eye view zone, so that the beam-splitting effect as the slit grating can be achieved. In this way, a left-eye image and a right-eye image from a display device can respectively enter into the left and right eyes of the viewer through the light refraction structure, and thereby the 3D display effect can be achieved. In the display device according to the embodiment of the invention, it is not necessary to provide the slit grating, thus light-blocking due to the opaque region of the slit grating can be avoided. In addition, in the display device according to the embodiment of the invention, the light refraction structure is formed by the light incidence surface of the substrate for forming the color filter substrate or by the color filter film on the color filter substrate, thus there is no need to form an additional layer for the light refraction structure on the color filter substrate. Therefore, the brightness of the display device can be improved, the production complexity and cost of the display device can be reduced, and in the meantime, the overall thickness and weight of the display device can be reduced for the light refraction structure is not necessary to be formed by using an additional layer.

According to an embodiment of the invention, a fabrication method of a color filter substrate is provided. The method comprises the following steps.

S501: Forming a color filter film on a substrate.

The color filter film may be formed on the substrate by a conventional manner. For example, the color filter film may be formed by applying or depositing a color photosensitive resin on the substrate.

S502: Continuously forming at least one light refraction structure by the color filter film through a patterning process. Each light refraction structure corresponds to a set of FOVs, and the set of FOVs includes a left-eye FOV and a right-eye FOV. Light rays from the left-eye FOV pass through the portion of the light refraction structure to which the left-eye FOV corresponds into the left-eye view zone, light rays from the right-eye FOV pass through the other portion of the light refraction structure to which the right-eye FOV corresponds into the right-eye view zone.

For example, a mask plate with gradually varied grayscales is adopted to perform the patterning process on the color filter film. Because different regions of such mask plate have different transmittance, thus different regions of the color filter film are exposed with different exposure degrees so that the light refraction structure with non-uniform thickness is formed. By controlling the direction of grayscale gradual variation of the mask plate, the thickness of the light refraction structure is continuously varied.

The light refraction structure may be a triangular light refraction structure or a lenticular lens light refraction structure. The triangular light refraction structure may include a surface in parallel with the substrate and two inclined surface. Light rays from the left-eye FOV pass through the inclined surface to which the left-eye FOV corresponds into the left-eye view zone, and light rays from the right-eye FOV pass through the other inclined surface to which the right-eye FOV corresponds into the right-eye view zone. The lenticular lens light refraction structure may have a surface being a cylindrical curved surface and the other surface in parallel with the substrate. Light rays from the left-eye FOV pass through a portion of the cylindrical curved surface to which the left-eye FOV corresponds into the left-eye view zone, and light rays from the right-eye FOV pass through the other portion of the cylindrical curved surface to which the right-eye FOV corresponds into the right-eye view zone.

The formation of the light refraction structure does not require any treatments on the substrate, but merely requires performing processing on the color filter film. Therefore, the production difficulty of the color filter substrate with the light refraction structure can be effectively reduced and the production cost can be decreased.

By the fabrication method of the color filter substrate according to the embodiment of the invention, at least one light refraction structure is continuously faulted on the color filter substrate, each light refraction structure corresponds to the set of FOVs, and the set of FOVs includes the left-eye FOV and the right-eye FOV. Light rays from the left-eye FOV pass through the portion of the light refraction structure to which the left-eye FOV corresponds into the left-eye view zone, light rays from the right-eye FOV pass through the other portion of the light refraction structure to which the right-eye FOV corresponds into the right-eye view zone, so that the beam-splitting effect as the slit grating can be achieved. In this way, a left-eye image and a right-eye image from a display device can respectively enter into the left and right eyes of the viewer through the light refraction structure, and thereby the 3D display effect can be achieved. By the fabrication method of the color filter substrate according to the embodiment of the invention, it is not necessary to provide the slit grating, thus light-blocking due to the opaque region of the slit grating can be avoided. In addition, by the fabrication method of the color filter substrate according to the embodiment of the invention, the light refraction structure is formed by the color filter film on the color filter substrate, thus there is no need to form an additional layer for the light refraction structure on the color filter substrate. Therefore, the brightness of the display device comprising the fabricated color filter substrate can be improved, the production complexity and cost of the display device can be reduced, and in the meantime, the overall thickness and weight of the display device can be reduced for the light refraction structure is not necessary to be formed by using an additional layer.

According to an embodiment of the invention, another fabrication method of a color filter substrate is provided. The method comprises the following steps.

S601: Continuously forming at least one light refraction structure by a light incidence surface of a substrate by a patterning process.

For example, the substrate may be a glass substrate. A photoresist is firstly applied on the substrate, and then a mask plate with gradually varied grayscales is adopted to perform the patterning process on the light incidence surface of the substrate. Because different regions of such mask plate have different transmittance, thus different regions of the light incidence surface of the substrate are etched with different degrees so that the light refraction structure with non-uniform thickness is formed. By controlling the direction of grayscale gradual variation of the mask plate, the thickness of the light refraction structure is continuously varied.

S602: Forming a color filter film on the light refraction structure on the substrate. Each light refraction structure corresponds to the set of FOVs, and the set of FOVs includes the left-eye FOV and the right-eye FOV. Light rays from the left-eye FOV pass through the portion of the light refraction structure to which the left-eye FOV corresponds into the left-eye view zone, light rays from the right-eye FOV pass through the other portion of the light refraction structure to which the right-eye FOV corresponds into the right-eye view zone.

Further, the color filter film may have a uniform thickness, or the color filter film may have a non-uniform thickness so that a light incidence surface of the color filter film is a flat surface.

The color filter film may be formed by a conventional manner. For example, the color filter film may be formed by applying or depositing a color photosensitive resin on the light refraction structure on the substrate.

The light refraction structure may be a triangular light refraction structure or a lenticular lens light refraction structure.

The formation of the light refraction structure is not necessary to perform any treatments on the color filter film so that the color quality of the display device comprising the fabricated color filter substrate can be ensured.

By the fabrication method of the color filter substrate according to the embodiment of the invention, at least one light refraction structure is continuously formed on the color filter substrate, each light refraction structure corresponds to the set of FOVs, and the set of FOVs includes the left-eye FOV and the right-eye FOV. Light rays from the left-eye FOV pass through the portion of the light refraction structure to which the left-eye FOV corresponds into the left-eye view zone, light rays from the right-eye FOV pass through the other portion of the light refraction structure to which the right-eye FOV corresponds into the right-eye view zone, so that the beam-splitting effect as the slit grating can be achieved. In this way, a left-eye image and a right-eye image from a display device can respectively enter into the left and right eyes of the viewer through the light refraction structure, and thereby the 3D display effect can be achieved. By the fabrication method of the color filter substrate according to the embodiment of the invention, it is not necessary to provide the slit grating, thus light-blocking due to the opaque region of the slit grating can be avoided. In addition, by the fabrication method of the color filter substrate according to the embodiment of the invention, the light refraction structure is formed by the light incidence surface of the substrate for forming the color filter substrate, thus there is no need to form an additional layer for the light refraction structure on the color filter substrate. Therefore, the brightness of the display device comprising the fabricated color filter substrate can be improved, the production complexity and cost of the display device can be reduced, and in the meantime, the overall thickness and weight of the display device can be reduced for the light refraction structure is not necessary to be formed by using an additional layer.

The foregoing are only preferable embodiments of the invention. It is to be noted that, those with ordinary skills in the art may make various modifications and changes without departing the technical principle of the invention, and these modifications and changes should be deemed to be within the protection scope of the invention.

What is claimed is:

1. A color filter substrate, comprising: a substrate and a color filter film formed on a light incidence side of the substrate, wherein
    at least one light refraction structure is continuously formed on a light incidence side of the color filter substrate, wherein the light incidence side of the color filter substrate is a side of the color filter substrate that faces a liquid crystal layer, and a light that passes through the liquid crystal layer enters the color filter substrate from the light incidence side of the color filter substrate;
    each light refraction structure corresponds to a set of field of views (FOVs); and
    the set of FOVs includes a left-eye FOV and a right-eye FOV, light rays from the left-eye FOV pass through a portion of the light refraction structure to which the left-eye FOV corresponds into a left-eye view zone, and light rays from the right-eye FOV pass through the other portion of the light refraction structure to which the right-eye FOV corresponds into a right-eye view zone.

2. The color filter substrate according to claim 1, wherein the light refraction structure is a triangular light refraction structure, the triangular light refraction structure include a surface in parallel with the substrate and two inclined surface, light rays from the left-eye FOV pass through the inclined surface to which the left-eye FOV corresponds into the left-eye view zone, and light rays from the right-eye FOV pass through the other inclined surface to which the right-eye FOV corresponds into the right-eye view zone; or
    the light refraction structure is a lenticular lens light refraction structure, the lenticular lens light refraction structure have a surface being a cylindrical curved surface and the other surface in parallel with the substrate, light rays from the left-eye FOV pass through a portion of the cylindrical curved surface to which the left-eye FOV corresponds into the left-eye view zone, and light rays from the right-eye FOV pass through the other portion of the cylindrical curved surface to which the right-eye FOV corresponds into the right-eye view zone.

3. The color filter substrate according to claim 2, wherein a width of the light refraction structure is equal to a width of the set of FOVs;
  if the light refraction structure is the triangular light refraction structure, the two inclined surfaces of the triangular light refraction structure have an equal length, and the triangular light refraction structure is an isosceles triangle;
  if the light refraction structure is the lenticular lens light refraction structure, the cylindrical curved surface of the lenticular lens light refraction structure is a eudipleural cylindrical curved surface.

4. The color filter substrate according to claim 3, wherein an angle formed between each of the inclined surfaces of the light refraction structure and the substrate is within 15°~60°.

5. The color filter substrate according to claim 1, wherein the light refraction structure is formed by the color filter film on the color filter substrate.

6. The color filter substrate according to claim 1, wherein the light refraction structure is formed by the light incidence surface of the substrate, and the color filter film is formed on the light refraction structure.

7. The color filter substrate according to claim 6, wherein the color filter film have a uniform thickness; or
  the color filter film have a non-uniform thickness so that a light incidence surface of the color filter film is a flat surface.

8. A display device, comprising the color filter substrate according to claim 1.

9. A fabrication method of a color filter substrate, comprising:
  forming a color filter film on a substrate; and
  forming at least one light refraction structure by the color filter film through a patterning process, wherein the at least one light refraction structure is continuously formed on a light incidence side of the substrate, the color filter film and the at least one light refraction structure are formed as being a same component of the color filter substrate, the light incidence side of the substrate is a side of the substrate that faces a liquid crystal layer, and a light that passes through the liquid crystal layer enters the substrate from the light incidence side of the substrate; and
  wherein each light refraction structure corresponds to a set of FOVs, the set of FOVs includes a left-eye FOV and a right-eye FOV, light rays from the left-eye FOV pass through the portion of the light refraction structure to which the left-eye FOV corresponds into the left-eye view zone, and light rays from the right-eye FOV pass through the other portion of the light refraction structure to which the right-eye FOV corresponds into the right-eye view zone.

10. The fabrication method of the color filter substrate according to claim 9, wherein the light refraction structure is a triangular light refraction structure, the triangular light refraction structure include a surface in parallel with the substrate and two inclined surface, light rays from the left-eye FOV pass through the inclined surface to which the left-eye FOV corresponds into the left-eye view zone, and light rays from the right-eye FOV pass through the other inclined surface to which the right-eye FOV corresponds into the right-eye view zone; or
  the light refraction structure is a lenticular lens light refraction structure, the lenticular lens light refraction structure have a surface being a cylindrical curved surface and the other surface in parallel with the substrate, light rays from the left-eye FOV pass through a portion of the cylindrical curved surface to which the left-eye FOV corresponds into the left-eye view zone, and light rays from the right-eye FOV pass through the other portion of the cylindrical curved surface to which the right-eye FOV corresponds into the right-eye view zone.

11. A fabrication method of a color filter substrate, comprising:
  forming at least one light refraction structure on a substrate by a patterning process, wherein the at least one light refraction structure is continuously formed by a light incidence surface of the substrate, wherein the at least one light refraction structure and the light incidence surface of the substrate are formed as being a same component of the substrate, wherein the light incidence surface of the substrate faces a liquid crystal layer, and a light that passes through the liquid crystal layer enters the substrate from the light incidence surface of the substrate; and
  forming a color filter film on the light refraction structure on the substrate,
  wherein each light refraction structure corresponds to a set of FOVs, the set of FOVs includes a left-eye FOV and a right-eye FOV, light rays from the left-eye FOV pass through the portion of the light refraction structure to which the left-eye FOV corresponds into the left-eye view zone, and light rays from the right-eye FOV pass through the other portion of the light refraction structure to which the right-eye FOV corresponds into the right-eye view zone.

12. The fabrication method of the color filter substrate according to claim 11, wherein the color filter film have a uniform thickness; or
  the color filter film have a non-uniform thickness so that a light incidence surface of the color filter film is a flat surface.

13. The fabrication method of the color filter substrate according to claim 11, wherein the light refraction structure is a triangular light refraction structure, the triangular light refraction structure include a surface in parallel with the substrate and two inclined surface, light rays from the left-eye FOV pass through the inclined surface to which the left-eye FOV corresponds into the left-eye view zone, and light rays from the right-eye FOV pass through the other inclined surface to which the right-eye FOV corresponds into the right-eye view zone; or
  the light refraction structure is a lenticular lens light refraction structure, the lenticular lens light refraction structure have a surface being a cylindrical curved surface and the other surface in parallel with the substrate, light rays from the left-eye FOV pass through a portion of the cylindrical curved surface to which the left-eye FOV corresponds into the left-eye view zone, and light rays from the right-eye FOV pass through the other portion of the cylindrical curved surface to which the right-eye FOV corresponds into the right-eye view zone.

* * * * *